(12) United States Patent
De Vrij et al.

(10) Patent No.: US 11,591,497 B2
(45) Date of Patent: Feb. 28, 2023

(54) PRESSURE SENSITIVE ADHESIVE WITH BROAD DAMPING TEMPERATURE RANGE

(71) Applicant: Avery Dennison Corporation, Glendale, CA (US)

(72) Inventors: Sara De Vrij, Turnhout (BE); Ingrid E. Geuens, Ranst (BE); Celine E. J. Huyskens, Turnhout (BE)

(73) Assignee: Avery Dennison Corporation, Mentor, OH (US)

( * ) Notice: Subject to any disclaimer, the term of this patent is extended or adjusted under 35 U.S.C. 154(b) by 340 days.

(21) Appl. No.: 16/761,958

(22) PCT Filed: Sep. 20, 2018

(86) PCT No.: PCT/US2018/051910
§ 371 (c)(1),
(2) Date: May 6, 2020

(87) PCT Pub. No.: WO2019/118038
PCT Pub. Date: Jun. 20, 2019

(65) Prior Publication Data
US 2021/0179895 A1    Jun. 17, 2021

Related U.S. Application Data

(60) Provisional application No. 62/598,875, filed on Dec. 14, 2017.

(51) Int. Cl.
*C09J 7/38* (2018.01)
*C08G 77/08* (2006.01)
(Continued)

(52) U.S. Cl.
CPC ............... *C09J 7/38* (2018.01); *C08G 77/08* (2013.01); *C08G 77/70* (2013.01); *C08K 5/14* (2013.01);
(Continued)

(58) Field of Classification Search
CPC ...... C09J 7/38; C09J 183/04; C09J 2303/354; C09J 2301/208; C09J 2301/408;
(Continued)

(56) References Cited

U.S. PATENT DOCUMENTS 5,118,562 A    6/1992  Johnson et al.
5,267,487 A   12/1993  Falco et al.
(Continued)

FOREIGN PATENT DOCUMENTS

CN    102604166        7/2012
CN    204104124 U      1/2015
(Continued)

OTHER PUBLICATIONS

"Dowsil Q2-7406 Adhesive", The Dow Chemical Company, 2019 (Year: 2019).*
(Continued)

*Primary Examiner* — Michael M. Bernshteyn

(57) ABSTRACT

A damping-enhanced pressure-sensitive adhesive comprising a pressure-sensitive adhesive and a at least one damping additive. The pressure-sensitive adhesive comprises a silicone-based polymer and optionally, at least one catalyst and/or at least one initiator.

34 Claims, 1 Drawing Sheet

Frequency (Hz)

(51) Int. Cl.
  *C08K 5/14* (2006.01)
  *C08L 83/04* (2006.01)
  *C09J 183/04* (2006.01)
  *C08G 77/00* (2006.01)

(52) U.S. Cl.
  CPC .............. *C08L 83/04* (2013.01); *C09J 183/04* (2013.01); *C08G 2350/00* (2013.01); *C08L 2205/03* (2013.01); *C08L 2205/22* (2013.01); *C08L 2312/00* (2013.01); *C09J 2203/354* (2020.08); *C09J 2301/208* (2020.08); *C09J 2301/408* (2020.08); *C09J 2421/00* (2013.01); *C09J 2433/00* (2013.01)

(58) Field of Classification Search
  CPC ................. C09J 2421/00; C09J 2433/00; C09J 2203/354; C08G 77/08; C08G 77/70; C08G 2350/00; C08K 5/14; C08L 83/04; C08L 2205/03; C08L 2205/22; C08L 2312/00
  USPC .......................................................... 428/355
  See application file for complete search history.

(56) References Cited

U.S. PATENT DOCUMENTS

| | | | |
|---|---|---|---|
| 5,308,887 A * | 5/1994 | Ko | C09J 4/00 526/279 |
| 5,352,528 A | 10/1994 | L'her et al. | |
| 5,488,081 A | 1/1996 | Halladay | |
| 5,552,209 A | 9/1996 | McCutcheon | |
| 5,624,763 A | 4/1997 | Melancon et al. | |
| 5,695,867 A | 12/1997 | Saitoh et al. | |
| 5,855,353 A | 1/1999 | Shaffer et al. | |
| 5,876,855 A | 3/1999 | Wong et al. | |
| 6,069,219 A | 5/2000 | McCormick et al. | |
| 6,126,865 A | 10/2000 | Haak et al. | |
| 6,132,882 A | 10/2000 | Landin et al. | |
| 6,177,173 B1 | 1/2001 | Nelson | |
| 6,251,493 B1 | 6/2001 | Johnson et al. | |
| 6,285,525 B1 * | 9/2001 | McCutcheon | B32B 27/06 |
| 6,294,249 B1 | 9/2001 | Hamer et al. | |
| 6,310,125 B1 | 10/2001 | Rayner | |
| 6,348,118 B1 | 2/2002 | Johnson et al. | |
| 6,407,195 B2 | 6/2002 | Sherman et al. | |
| 6,444,311 B1 | 9/2002 | Friedman et al. | |
| 6,537,659 B2 | 3/2003 | Karim et al. | |
| 6,602,944 B2 | 8/2003 | Vaidya | |
| 6,664,359 B1 | 12/2003 | Kangas et al. | |
| 6,730,397 B2 | 5/2004 | Melancon et al. | |
| 6,800,157 B2 | 10/2004 | Tarbutton et al. | |
| 7,105,601 B2 | 9/2006 | Guo et al. | |
| 7,232,857 B2 | 6/2007 | Hirasawa | |
| 8,225,676 B2 | 7/2012 | Charlier | |
| 8,530,578 B2 | 9/2013 | Bharti et al. | |
| 8,536,241 B2 | 9/2013 | Hamer et al. | |
| 8,653,216 B2 | 2/2014 | Sherman et al. | |
| 8,710,139 B2 | 4/2014 | Shigetomi et al. | |
| 8,975,004 B2 | 3/2015 | Choi et al. | |
| 9,018,331 B2 | 4/2015 | Sherman et al. | |
| 9,033,102 B2 | 5/2015 | Payot et al. | |
| 9,157,241 B2 | 10/2015 | Boyadjian et al. | |
| 9,693,143 B2 | 6/2017 | Bohm et al. | |
| 2002/0045043 A1 | 4/2002 | Kuniya et al. | |
| 2002/0108563 A1 | 8/2002 | Yoshida | |
| 2002/0117257 A1 | 8/2002 | Kubik | |
| 2005/0080193 A1 | 4/2005 | Wouters et al. | |
| 2005/0217789 A1 | 10/2005 | Eckstein et al. | |
| 2006/0182978 A1 | 8/2006 | Leroy et al. | |
| 2007/0218276 A1 | 9/2007 | Hiramatsu et al. | |
| 2008/0139722 A1 | 6/2008 | Shefelbine et al. | |
| 2008/0152854 A1 | 6/2008 | Arellano et al. | |
| 2008/0178929 A1 | 7/2008 | Skov et al. | |
| 2008/0194163 A1 | 8/2008 | Swan et al. | |
| 2008/0194759 A1 | 8/2008 | Casper | |
| 2008/0206544 A1 | 8/2008 | Kim et al. | |
| 2009/0169852 A1 | 7/2009 | Choi et al. | |
| 2009/0191396 A1 | 7/2009 | Swan et al. | |
| 2009/0212252 A1 | 8/2009 | Elgimiabi | |
| 2009/0291608 A1 | 11/2009 | Choi et al. | |
| 2011/0300296 A1 | 12/2011 | Sherman et al. | |
| 2012/0321886 A1 | 12/2012 | Tobing et al. | |
| 2014/0030462 A1 | 1/2014 | Sullivan | |
| 2014/0193603 A1 | 7/2014 | Elgimiabi | |
| 2014/0196762 A1 | 7/2014 | Davis et al. | |
| 2014/0224577 A1 | 8/2014 | Pathak et al. | |
| 2014/0367926 A1 | 12/2014 | Guan et al. | |
| 2015/0086730 A1 | 3/2015 | Guan et al. | |
| 2015/0158649 A1 | 7/2015 | Huang et al. | |
| 2015/0183975 A1 | 7/2015 | Clapper et al. | |
| 2015/0218429 A1 | 8/2015 | Salnikov et al. | |
| 2015/0267044 A1 | 9/2015 | Sherman et al. | |
| 2015/0267088 A1 | 9/2015 | Bogner et al. | |
| 2015/0299532 A1 | 10/2015 | Myers et al. | |
| 2015/0322304 A1 | 11/2015 | O'Neal et al. | |
| 2015/0353785 A1 | 12/2015 | Lewandowski et al. | |

FOREIGN PATENT DOCUMENTS

| | | |
|---|---|---|
| CN | 105814910 | 7/2016 |
| EP | 0206760 | 12/1986 |
| EP | 0540332 | 6/1995 |
| EP | 2836563 | 7/2016 |
| WO | 92/20752 | 11/1992 |
| WO | 95/12635 | 5/1995 |
| WO | 97/33946 | 9/1997 |
| WO | 99/24519 | 5/1999 |
| WO | 03/100289 | 12/2003 |
| WO | 2006/017302 | 2/2006 |
| WO | 2014/100921 | 7/2014 |
| WO | 2015/051000 | 4/2015 |
| WO | 2015/195620 | 12/2015 |
| WO | 2016/154181 | 9/2016 |
| WO | 2016/167924 | 10/2016 |

OTHER PUBLICATIONS

International Preliminary Report on Patentability dated Jun. 16, 2020 issued in corresponding IA No. PCT/US2018/051910 filed Sep. 20, 2018.

International Search Report and Written Opinion dated Nov. 21, 2018 issued in corresponding IA No. PCT/US2018/051910 filed Sep. 20, 2018.

Michaelis et al., "Plasticization and antiplasticization of an acrylic pressure sensitive adhesive by ibuprofen and their effect on the adhesion properties," European Journal of Pharmaceutics and Biopharmaceutics, 86 (2014) pp. 234-243.

Guiwaoulianji Ji Guishuzhi, Silicone Pressure-Sensitive Adhesive, pp. 248-249, Aug. 31, 2010.

* cited by examiner

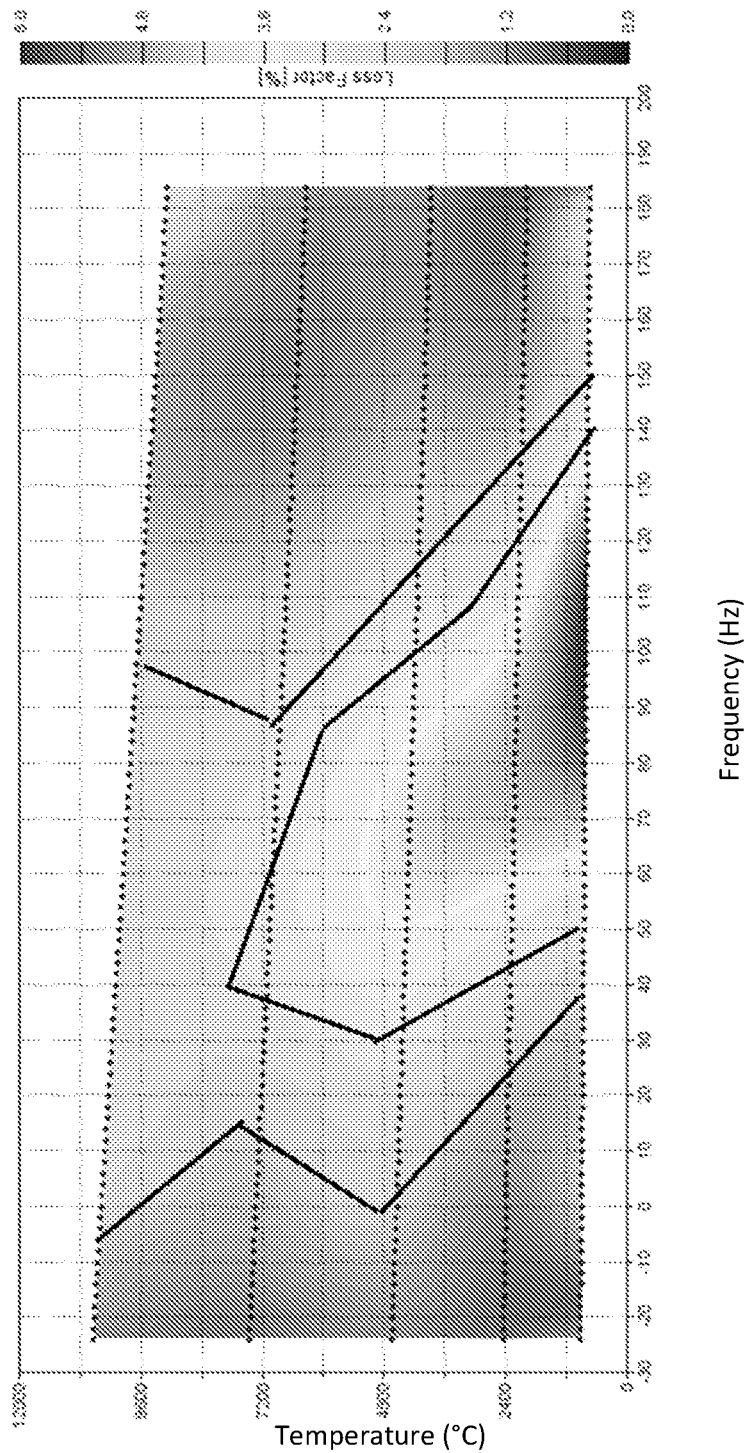

PRESSURE SENSITIVE ADHESIVE WITH BROAD DAMPING TEMPERATURE RANGE

CROSS-REFERENCE TO RELATED APPLICATION

The present application is a 371 of International Application No. PCT/US2018/051910, which was published in English on Jun. 20, 2019, and claims the benefit of U.S. Provisional Application 62/598,875 filed on Dec. 14, 2017, both of which are incorporated herein by reference in their entireties.

FIELD OF THE INVENTION

The present application relates generally to pressure-sensitive adhesives, in particular to improved pressure-sensitive adhesives having superior damping performance over a broad temperature and frequency range. This application also relates to products containing the improved pressure-sensitive adhesive as well as to methods of producing the same.

BACKGROUND OF THE INVENTION

Pressure-sensitive adhesives (also referred to herein as PSAs) are known to provide adhesiveness or tack to various substrates when applied at room temperature (defined herein as a temperature range of about 20° C. to about 25° C.). This adhesiveness can provide for instantaneous adhesion to the substrate when subjected to pressure. PSAs are generally easy to handle in solid form and have a long shelf-life, so they are widely used in the manufacture of many products. For example, PSAs provide a convenient and economical way to label various articles of commerce, such as glass, metal, and plastic portions of consumer and industrial products. PSAs may also be utilized in the manufacture of automotive components. In some applications, the PSAs are used to adhere components to one another. The PSAs may also provide additional functional properties such as damping. Damping may include vibration damping to mitigate resonant vibrations or other vibrations caused by a variety of sources, for example, in engine compartments, cab walls, enclosures, floor and ceiling systems, door panels, and brake systems. Damping may also include sound damping to lessen noise.

Vibrations may occur in many applications, including but not limited to transportation (e.g., ships and other watercrafts, railed vehicles, automobiles, trucks, buses, motorcycles, airplanes, and spacecraft), electronics, building materials, and appliances. However, the frequency and temperature ranges may vary in different applications and require certain approaches or techniques to reduce the vibrations. For these wide-ranging applications, the damping properties may be adjusted based on the frequency and temperature in the application. In a particular use, brake systems in transportation applications are generally known to experience vibrations. The vibrations occur both over the brake system as a whole and between the various components of it, e.g., between the brake pad layer and the caliper. The vibrations lead to undesirable performance characteristics such as sound generation, e.g., squeaking/squealing, or vehicle ride deficiencies, e.g., shaking. When PSAs are employed in brake applications, the PSAs damp vibrations as well as adhere brake component layers to one another. In another use, electronics are also known to experience vibrations. For example, computer or other electronic systems may experience vibrations during operation.

The performance of the PSAs may also be affected by climate and temperature. Unfortunately, conventional PSAs have been found to have damping properties over limited temperature and/or frequency ranges. As a result, different PSAs need to be developed to meet the damping requirements (temperature and frequency) for each specific application.

Even in view of any prior art references, the need exists for PSAs that provides superior damping performance over an improved (broader) temperature range and/or frequency range.

BRIEF DESCRIPTION OF DRAWINGS

The disclosure references the appended drawings, wherein like numerals designate similar parts.

FIG. 1 illustrates test results of the PSAs described herein using SAE J3001 (as measured by the Link Maultheet device) for loss factors at 2.5% and 3%.

SUMMARY OF THE INVENTION

The following presents a simplified summary of the disclosure to provide a basic understanding of some embodiments described in the detailed description.

In accordance with many embodiments, a damping-enhanced pressure-sensitive adhesive may comprise: 1) a silicone pressure-sensitive adhesive comprising: (a) at least one silicone-based polymer; (b) a resin; (c) optionally, at least one catalyst, and (d) optionally, at least one initiator; and 2) at least one damping additive selected from the group comprising an acrylic-based additive, a rubber-based additive, and combinations thereof. In accordance with some embodiments, a damping-enhanced pressure-sensitive adhesive may comprise: 1) a silicone pressure-sensitive adhesive comprising: (a) at least one silicone-based polymer; (b) a resin; (c) at least one catalyst; and (d) optionally, at least one initiator; and 2) at least one damping additive selected from the group comprising an acrylic-based additive, a rubber-based additive, and combinations thereof. In accordance with some embodiments, a damping-enhanced pressure-sensitive adhesive may comprise: 1) a silicone pressure-sensitive adhesive comprising: (a) at least one silicone-based polymer; (b) a resin; (c) at least one catalyst; and (d) at least one initiator; and 2) at least one damping additive selected from the group comprising an acrylic-based additive, a rubber-based additive, and combinations thereof. In accordance with some embodiments, a damping-enhanced pressure-sensitive adhesive may comprise: 1) a silicone pressure-sensitive adhesive comprising: (a) at least one silicone-based polymer; (b) a resin; (c) optionally, at least one catalyst; and (d) at least one initiator; and 2) at least one damping additive selected from the group comprising an acrylic-based additive, a rubber-based additive, and combinations thereof. The damping-enhanced pressure-sensitive adhesive described herein may have a damping temperature ranging from about −40° C. to about 200° C. and a frequency range between about 10 Hz and about 10000 Hz. In another embodiment, the temperature range of the damping-enhanced pressure-sensitive adhesive described herein may be between about −40° C. to about 150° C. In another embodiment, the frequency range of the damping-enhanced pressure-sensitive adhesive described herein may be between about 100 Hz and about 8000 Hz. In another embodiment, the resin of the silicone pressure-sensitive adhesive may further comprise an MQ resin. Further, also described herein is a tape comprising a layer of the damping enhanced PSA that is described herein. In some embodiments, the tape may be a transfer tape.

In accordance with further embodiments, method for modifying a silicone pressure-sensitive adhesive to improve damping characteristics, the method comprising: 1) providing a silicone pressure sensitive adhesive described herein, the silicone pressure sensitive adhesive having an initial damping temperature range and an initial damping frequency range; 2) determining a modified damping temperature range and modified damping frequency range; and 3) adding at least one damping additive to the silicone pressure-sensitive adhesive to form the damping-enhanced pressure-sensitive adhesive composition having the modified damping temperature range and the modified frequency range. In many embodiments, a method for modifying a pressure-sensitive adhesive to improve damping characteristics may comprise: 1) providing a silicone pressure-sensitive adhesive having an initial damping temperature range and an initial damping frequency range and comprising (a) at least one silicone-based polymer, (b) a resin; (c) optionally, at least one catalyst; and (d) optionally, at least one initiator; 2) determining a modified damping temperature range and modified damping frequency range; and 3) adding at least one damping additive selected from the group comprising an acrylic-based damping additive, a rubber-based damping additive, and combinations thereof to the silicone pressure-sensitive adhesive to form the damping-enhanced pressure-sensitive adhesive composition having the modified damping temperature range and modified damping frequency range. In accordance with other embodiments, a method for modifying a pressure-sensitive adhesive to improve damping characteristics may comprise: 1) providing a silicone pressure-sensitive adhesive having an initial damping temperature range and initial damping frequency range and comprising (a) at least one silicone-based polymer, (b) a resin; (c) at least one catalyst; and (d) at least one initiator; 2) determining a modified damping temperature and modified damping frequency range; and 3) adding at least one damping additive selected from the group comprising an acrylic-based damping additive, a rubber-based damping additive, and combinations thereof to the silicone pressure-sensitive adhesive to form the damping-enhanced pressure-sensitive adhesive composition having the modified damping temperature range and modified damping frequency range. In another embodiment, the resin of the silicone pressure-sensitive adhesive may comprise an MQ resin.

In many embodiments, the damping-enhanced pressure sensitive adhesive described herein may have a damping temperature range and a frequency range. The damping temperature range may be between about −40° C. to about 200° C. The damping temperature range may be an infinite amount of temperature ranges within from about −40° C. to about 200° C. In one embodiment, the temperature range may be between about −40° C. to about 200° C. In another embodiment, the temperature range may be between about −40° C. to about 150° C. In yet another embodiment, the temperature range may be between about 0° C. to about 100° C. The damping frequency range may be between about 10 Hz and about 10000 Hz. In another embodiment, the frequency range may be an infinite amount of frequency ranges between about 100 Hz and about 8000 Hz. In another embodiment, the frequency range may be between about 100 Hz and about 8000 Hz. Further, the damping enhanced pressure sensitive adhesive described herein may have a certain minimal damping % at a temperature range of about −40° C. to about 200° C. and a frequency range of about 10 Hz and about 10000 Hz (as measured by SAE J 3001). In many embodiments, the damping % is at least about 2.5% at a temperature range of about −40° C. to about 200° C. and a frequency range of 10 Hz and about 10000 Hz (as measured by SAE J 3001). In some embodiments where the damping-enhanced pressure-sensitive adhesive has a damping % of at least about 2.5%, the damping surface (frequency range times temperature range as measured by SAE J 3001) is at least 10% greater than the damping surface of a pressure-sensitive adhesive without at least one damping additive. In some embodiments where the damping-enhanced pressure-sensitive adhesive has a damping % of at least about 2.5%, the damping surface (frequency range times temperature range as measured by SAE J 3001) is at least 20% greater than the damping surface of a pressure-sensitive adhesive without at least one damping additive. In many embodiments where the damping % is at least about 2.5%, the damping surface is at least 10% greater than the damping surface of a pressure-sensitive adhesive without at least one damping additive. In some embodiments where the damping % is at least about 2.5%, the damping surface is at least 20% greater than the damping surface of a pressure-sensitive adhesive without at least one damping additive. In some embodiments where the damping % is at least about 2.5%, the damping surface is at least about 30% greater than the damping surface of a pressure-sensitive adhesive without at least one damping additive. In yet other embodiments where the damping % is at least about 2.5%, the damping surface is at least about 50% greater than the damping surface of a pressure-sensitive adhesive without at least one damping additive (as measured by SAE J 3001). In other embodiments, the damping-enhanced pressure sensitive adhesive described herein may have the damping % at a temperature range of about −40° C. to about 200° C. and a frequency range of about 10 Hz and about 10000 Hz and is at least about 3% (as measured by SAE J 3001). In some embodiments where the damping-enhanced pressure-sensitive adhesive has a damping % of at least about 3%, the damping surface (frequency range times temperature range as measured by SAE J 3001) is at least about 50% greater than the damping surface of a pressure-sensitive adhesive without at least one damping additive higher compared to the damping surface of the unmodified pressure-sensitive adhesive without at least one damping additive. In some embodiments where the damping-enhanced pressure-sensitive adhesive has a damping % of at least about 3%, the damping surface (frequency range times temperature range as measured by SAE J 3001) is at least about 100% greater than the damping surface of a pressure-sensitive adhesive without at least one damping additive higher compared to the damping surface of the unmodified pressure-sensitive adhesive without at least one damping additive. In some embodiments where the damping-enhanced pressure-sensitive adhesive has a damping % of at least about 3%, the damping surface (frequency range times temperature range as measured by SAE J 3001) is at least about 300% (as measured by SAE J 3001) greater than the damping surface of a pressure-sensitive adhesive without at least one damping additive. In many embodiments where the damping % is at least about 3%, the damping surface is at least about 200% greater than the damping surface of a pressure-sensitive adhesive without at least one damping additive (as measured by SAE J 3001). In many embodiments where the damping % is at least about 3%, the damping surface is about 300% greater (or 3 times higher) than the damping surface of a pressure-sensitive adhesive without at least one damping additive (as measured by SAE J 3001). Further, the damping % results may be seen in FIG. 1 where the damping % (modal damping) is shown as a function of temperature and frequency (as measured by the Link Maultheet device).

In accordance with some embodiments, a damping-enhanced pressure-sensitive adhesive may comprise: 1) a silicone pressure-sensitive adhesive comprising: (a) at least one silicone-based polymer; b) a resin; (c) optionally, at least one catalyst; and (d) optionally, at least one initiator; and 2) at least one damping additive selected from the group comprising an acrylic-based damping additive, a rubber-based damping additive, and combinations thereof, present in an amount ranging from about 0.1 wt % to about 50 wt %, based on the total dry weight of the damping-enhanced pressure-sensitive adhesive. In accordance with other embodiments, a damping-enhanced pressure-sensitive adhesive may comprise: 1) a silicone pressure-sensitive adhesive comprising: (a) at least one silicone-based polymer; (b) a resin; (c) at least one catalyst; and (d) at least one initiator; and 2) at least one damping additive selected from the group comprising an acrylic-based damping additive, a rubber-based damping additive, and combinations thereof, present in an amount ranging from about 0.1 wt % to about 50 wt %, based on the total dry weight of the damping-enhanced pressure-sensitive adhesive. Also disclosed is a tape comprising the pressure-sensitive adhesive described herein and a method for modifying the silicone PSA using the damping additives described herein.

DETAILED DESCRIPTION OF THE INVENTION

The present invention relates generally to pressure-sensitive adhesives (PSAs), in particular, to improved PSAs having consistent superior damping performance over broad temperature and/or frequency ranges. This characteristic can be particularly important when the PSAs are utilized in automotive components such as brake systems wherein the performance requirements differ depending on the climate of the geographical region in which the components are utilized. It can also be important if material is used to prevent a multiple source of vibration, noise and harshness (and thus different frequencies). PSAs capable of superior damping over such broad ranges are beneficial to ensure that excessive design configurations (and changes to design configurations) are not necessary to develop products with no or reduced damping properties, including but not limited to brake systems and other transportation applications, appliances, building materials, and electronics.

As noted above, several PSAs are known. Many of these PSAs, however, were developed for applications in which damping ability was not a factor, e.g., label applications or graphic applications. In some cases, PSAs have been used for damping applications. The PSAs may be formulated such that the polymer may be adjusted to provide damping within certain temperatures and/or frequencies. Unfortunately, these PSAs typically exhibit damping properties in a limited temperature and/or frequency range. However, for certain applications it might be desirable to apply a PSA that exhibits damping over a broad(er) range of temperatures and frequencies.

Certain additives have been known to alter the properties of typical PSAs. For example, conventional tackifiers have been used to modify the mechanical performance and adhesive behavior of adhesive compositions. Conventional tackifiers have been found to be especially useful as additives to pressure sensitive adhesives, enhancing the tape performance on tack as well as improving the adhesion performance. For example, MQ resin can be added to silicone PSA for the same purpose.

Rubber and silicone (including those in powder form) are known in the art, however these compounds are typically used as fillers and are employed in high amounts, e.g., over 50 wt %, based on the total weight of a composition. Other than adjusting the type and kind of polymer in the PSA, there has not been further means to improve the damping properties in pressure-sensitive adhesives, especially in broader frequency and temperature ranges. The use of certain additives (referred to as "damping additives") disclosed herein may provide certain damping properties not previously known in the art. In many embodiments, the damping additives described may provide (both) a shift in the frequency and/or temperature ranges for damping. Additionally, these damping additives described herein may be incorporated at lower amounts (by weight) than how they would typically be added as fillers. Further, the damping additives described herein may provide damping properties at a certain temperature range and/or certain frequency range in combination with silicone PSA. Unlike traditional additives for damping, the damping additives described herein provide damping properties over a larger temperature range and/or larger frequency range. The damping additives described herein may be comprised of at least one damping additive selected from the group comprising an acrylic-based damping additive, a rubber-based damping additive, and combinations thereof. The damping properties of the damping additives described herein may be further optimized through formulation with the pressure sensitive adhesive (PSA). Depending on the application and desired properties, both the PSA and the damping additive may be formulated such that damping may be provided in particular temperature and/or frequency ranges.

Disclosed herein is a damping-enhanced PSA with particular combinations of components, optionally utilized in specific amounts, surprisingly provide for high performance PSAs that demonstrate damping ability over broad temperature and/or frequency ranges. In particular, the inventors have found that the use of specific acrylic-based damping additives and/or rubber-based damping additives, optionally utilized in specific amounts, as an additive to a silicone-based PSA may provide PSAs that demonstrate the aforementioned performance characteristics. Beneficially, the resultant PSAs have the capability to provide superior damping performance, as quantified by damping % (as measured by SAE J3000 test method where damping % is measured over a certain temperature and frequency range) and the damping surface (calculated from the surface area based on temperature range and frequency range where the damping % has been determined and exceeds a specified level) under many temperature and frequency conditions. Based on SAE J3001, the damping graph has a certain temperature (X axis) and certain frequency (Y axis). The damping surface is the surface of this area based on the temperature and frequency where the temperature range is multiplied by the frequency range.

Conventionally, there has been little or no teaching of the concept of employing these damping additives to affect damping properties of a PSA and using this information to modify the damping performance of a PSA.

Without being bound by theory, the combination of the silicone pressure-sensitive adhesive with a certain weight ratio to the damping additives may provide improved damping performance over a certain temperature and/or frequency range.

In some embodiments, the present invention relates to a damping-enhanced PSA comprising a silicone pressure-sensitive adhesive and at least one damping additive. In some embodiments, the damping-enhanced pressure-sensitive adhesive may comprise: 1) a silicone pressure-sensitive adhesive comprising (a) at least one silicone-based polymer; (b) a resin; and (c) optionally, at least one catalyst; and (d) optionally, at least initiator; and 2) at least one damping additive selected from the group comprising an acrylic-based damping additive, a rubber-based damping additive, and combinations thereof. In other embodiments, the damping-enhanced pressure-sensitive adhesive may comprise: 1) a silicone pressure-sensitive adhesive comprising (a) at least one silicone-based polymer; (b) a resin; (c) at least one catalyst; and (d) at least one initiator; and 2) at least one damping additive selected from the group comprising an acrylic-based damping additive, a rubber-based damping additive, and combinations thereof. At least one damping-enhanced pressure-sensitive adhesive may have a damping temperature ranging from about −40° C. to about 200° C. Further, at least one damping-enhanced pressure-sensitive adhesive may have a damping frequency ranging from about 10 Hz to about 10000 Hz. The damping additive comprises a compound selected from the group comprising an acrylic-based damping additive, a rubber-based damping additive, and combinations thereof. In particular embodiments, the damping additive is present in low amounts, e.g., amounts much lower than would be used if the damping additive was included for another purpose, for example as a filler material. For example, the damping additive may be present in the damping-enhanced PSA in an amount ranging from about 0.1 wt % to about 50 wt %. In some embodiments, the damping additive may be present at about 0.5 wt % to about 45 wt %. In other embodiments, the damping additive may be present at about 1 wt % to about 40 wt %. In yet other embodiments, the damping additive may be present at about 1 wt % to about 35 wt %. In other embodiments, the damping additive may be present at about 1 wt % to about 30 wt %. In some embodiments, the damping additive may be present at about 1 wt % to about 25 wt %. In other embodiments, the damping additive may be present at about 1 wt % to about 20 wt %. In some embodiments, the damping additive may be present at about 1 wt % to about 15 wt %. In yet other embodiments, the damping additive may be present at about 1 wt % to about 10 wt %. The combination of the silicone-based PSA and the damping additive (optionally in the low amounts, unexpectedly provides for superior damping performance over broad temperature and/or frequency ranges, as described above. The damping-enhanced PSA may comprise at least one resin. In many embodiments, at least one resin may comprise an MQ resin.

In one embodiment, the damping-enhanced PSA comprises the silicone pressure-sensitive adhesive in an amount at least about 50 wt %, at least about 60 wt %, at least about 70 wt %, at least about 75 wt %, at least about 80 wt %, at least about 90 wt %, or at least about 95 wt %. In terms of ranges, the damping-enhanced PSA comprises the pressure-sensitive adhesive in an amount ranging from about 50 wt % to about 99 wt %, e.g., from about 55 wt % to about 97 wt %, from about 60 wt % to about 95 wt %, from about 75 wt % to about 95 wt %, from about 80 wt % to about 95 wt %, from about 85 wt % to about 95 wt %, or from about 87 wt % to about 93 wt %. In terms of upper limits, the damping-enhanced pressure-sensitive adhesive comprises the PSA in an amount less than about 99 wt %, e.g., less than about 97 wt %, less than about 95 wt %, less than about 90 wt %, less than about 85 wt %, less than about 80 wt %, less than about 70 wt %, or less than about 60 wt %. In some embodiments, the silicone PSA is present in an amount ranging from about 50 wt % to about 99 wt %, based on the total dry weight of the damping-enhanced silicone PSA.

In one embodiment, the damping-enhanced PSA comprises the damping additive in an amount less than about 50 wt %, e.g., less than about 37%, less than about 35%, less than about 33%, less than about 30%, less than about 25 wt %, less than about 23 wt %, less than about 20 wt %, less than about 18 wt %, less than about 15 wt %, less than about 12 wt %, less than about 10 wt %, less than about 8 wt %, less than about 6 wt %, less than about 5 wt %, less than about 4 wt %, less than about 3 wt %, less than about 2 wt %, or less than about 1 wt %. In terms of ranges, the damping-enhanced pressure-sensitive adhesive comprises the damping additive in an amount ranging from about 0.1 wt % to about 50 wt %, e.g., from about 1 wt % to about 37 wt %, from about 1 wt % to about 36 wt %, from about 1 wt % to about 35 wt %, from about 1 wt % to about 33 wt %, from about 1 wt % to about 30 wt %, from about 1 wt % to about 25 wt %, from about 1 wt % to about 20 wt %, from about 2 wt % to about 18 wt %, from about 3 wt % to about 18 wt %, from about 5 wt % to about 15 wt %, from about 7 wt % to about 12 wt %, from about 8 wt % to about 12 wt %, or from about 9 wt % to about 11 wt %. In terms of lower limits, the damping-enhanced PSA comprises the damping additive in an amount at least about 0.1 wt %, e.g., at least about 0.5 wt %, at least about 1 wt %, at least about 2 wt %, at least about 3 wt %, at least about 5 wt %, at least about 7 wt %, at least about 10 wt %, at least about 12 wt %, at least about 15 wt %, or at least about 20 wt %. In terms of upper limits, the damping-enhanced PSA comprises the damping additive in an amount less than about 50 wt %, e.g., less than about 45 wt %, less than about 40 wt %, less than about 35 wt %, less than about 30 wt %, less than about 25 wt %, less than about 20 wt %, less than about 15 wt %, less than about 10 wt %, less than about 8 wt %, less than about 5 wt %, less than about 4 wt %, less than about 3 wt %, less than about 2 wt %, or less than about 1 wt %.

The damping-enhanced PSA may have a certain modified damping temperature range and modified damping frequency range, and the damping temperature and damping frequency may be determined by measurement. Damping performance may be quantified through loss factor (h) or damping ratio (% of critical damping). Damping range may be measured from about −40° C. to about 200° C. and frequency between about 10 Hz and about 10 kHz. The loss factor may be measurement by Oberst beam testing (VBT), DMA, or SAE J 3001.

In some embodiments, damping temperature ranges or frequency ranges can be determined for individual damping additives (and for conventional PSAs). And, once the damping temperature or frequency ranges are determined for individual damping additives, these damping temperature or frequency ranges can be used in the modification of the conventional PSAs to yield the damping-enhanced PSAs. Beneficially, once the damping temperature or frequency range for a damping additive is determined, a damping-enhanced PSA can be formulated based on the damping temperature or frequency range of the damping additive. As a result, damping-enhanced PSAs can be tailored to a modified damping temperature range or modified damping frequency range. In one example, a damping additive may be found to have a damping temperature range from about 0° C. to about 40° C., when this damping additive can be added to a conventional PSA having a damping temperature range from about 20° C. to about 80° C. to yield a damping-enhanced PSAs having a broader damping temperature range, e.g., from about 10° C. to about 80° C. Further for this example, at least one damping additive damping-enhanced pressure-sensitive adhesive may have a damping frequency ranging from about 7200 Hz to about 10000 Hz. The use of the specific damping additives and the respective damping temperature or frequency ranges advantageously provides superior damping performance over an improved (broader) temperature range. For example, silicone pressure-sensitive adhesives may damp at lower frequencies relative to rubber-based damping additives which damp at higher frequencies. The combination of both the silicone pressure-sensitive adhesive and the rubber-based damping additive may provide damping over a broader frequency range.

Thus, in some embodiments, the invention relates to a method for modifying a (conventional) silicone PSA to improve damping characteristics and to yield a damping-enhanced PSA. The method comprises the step of providing a (conventional) silicone PSA having an initial damping temperature range and initial damping frequency range (determined as described above). This silicone PSA may comprise a at least one silicone-based polymer and a catalyst (as well as other optional components) The resin of the silicone PSA may also comprise an MQ resin. In some embodiments, the PSA may further comprise a crosslinker. The method further comprises the step of determining a modified damping temperature range and modified damping frequency range, which is an improvement on the damping temperature and frequency range of the conventional PSA. To achieve the modified damping temperature range and modified damping frequency range, the method further comprises the steps of providing at least one damping additive (as described herein). The method also comprises the step of adding at least one damping additive to the silicone PSA to form the damping-enhanced silicone PSA composition having the modified damping temperature range and modified damping frequency range.

In some embodiments, a method for modifying a pressure-sensitive adhesive to improve damping characteristics may comprise: 1) providing a pressure-sensitive adhesive having an initial damping temperature range and initial damping frequency range and comprising: (a) a pressure-sensitive adhesive comprising: (i) a silicone pressure-sensitive adhesive, (ii) a resin; (iii) optionally at least one catalyst; and (iv) optionally at least one initiator; 2) determining a modified damping temperature range and modified damping frequency range; and 3) adding a damping additive selected from the group comprising an acrylic-based damping additive, a rubber-based damping additive, and combinations thereof to the silicone pressure-sensitive adhesive to form the damping-enhanced pressure-sensitive adhesive composition having the modified damping temperature range and/or modified damping frequency range. In another embodiment, a method for modifying a pressure-sensitive adhesive to improve damping characteristics may comprise: 1) providing a pressure-sensitive adhesive having an initial damping temperature range and initial damping frequency range and comprising: (a) a pressure-sensitive adhesive comprising: (i) a silicone pressure-sensitive adhesive, (ii) a resin; (iii) at least one catalyst; and (iv) at least one initiator; 2) determining a modified damping temperature range and modified damping frequency range; and 3) adding a damping additive selected from the group comprising an acrylic-based damping additive (liquid or solid at about 20° C. to about 25° C.), a rubber-based damping additive (liquid or solid at about 20° C. to about 25° C.), and combinations thereof to the silicone pressure-sensitive adhesive to form the damping-enhanced pressure-sensitive adhesive composition having the modified damping temperature range and/or modified damping frequency range. In many embodiments, the pressure-sensitive adhesive is the PSA described herein. In another embodiment, the method for modifying a pressure-sensitive adhesive to improve damping characteristics may further comprise determining an amount of the damping additive. In some embodiments, the method for modifying a pressure-sensitive adhesive to improve damping characteristics may further comprise determining an amount of the damping additive, based on the initial damping temperature range and initial frequency range after determining the modified damping temperature range and/or modified damping frequency range. In some embodiments, the amount of the damping additive may be determined based on: 1) the initial damping temperature range and initial damping frequency range and/or the modified damping temperature range and modified damping frequency range; and 2) the damping additive to the silicone pressure-sensitive adhesive composition in the determined amount. Optionally, an MQ resin may be added as part of the pressure-sensitive adhesive. In some embodiments, the MQ resin may be Silgrip SR545 (Momentive).

In another embodiment, the method for modifying a pressure-sensitive adhesive to improve damping characteristics may further comprise: determining an amount of the damping additive, based on the initial damping temperature range and initial damping frequency range after determining the modified damping temperature range and modified damping frequency range. Optionally, an MQ resin may be added as part of the resin of the silicone pressure-sensitive adhesive.

In some embodiments, a damping-enhanced pressure-sensitive adhesive may comprise: 1) a pressure-sensitive adhesive comprising: (a) at least one silicone-based polymer, (b) a resin; (c) optionally at least one catalyst; and (d) optionally at least one initiator; and 2) damping additive selected from the group comprising an acrylic-based damping additive, a rubber-based damping additive, and combinations thereof, present in an amount ranging from about 0.1 wt % to about 35 wt %, based on the total dry weight of the damping-enhanced pressure-sensitive adhesive.

Similar processes are contemplated wherein damping frequency ranges are measured and used in the determinations.

In many embodiments, the amount of the damping additive added to the PSA may also be determined based on the initial damping temperature and initial damping frequency range of the PSA. In some cases, the method comprises the step of determining an amount of the damping additive based on the initial damping temperature and initial damping frequency range of the PSA after determining the modified damping temperature range and modified damping frequency range. In other cases, the method comprises the step of determining an amount of the damping additive, and the modified damping temperature range and modified damping frequency range and adding the damping additive to the pressure-sensitive adhesive composition in the determined amount. In some embodiments, increased amounts of damping additives may provide increased damping within certain temperature and/or frequency ranges.

In one embodiment, the damping-enhanced PSA has a damping temperature ranging from about −40° C. to about 200° C., e.g., from about −40° C. to about 150° C., from about −40° C. to about 120° C., from about −35° C. to about 100° C., from about −30° C. to about 80° C., from about −30° C. to about 0° C., from about 0° C. to about 80° C., from about 0° C. to about 60° C., from about −30° C. to about 40° C., from about 0° C. to about 40° C., from about 20° C. to about 80° C., or from about 20° C. to about 60° C.

In one embodiment, the damping-enhanced PSA comprising the damping-enhanced additive has a damping temperature ranging from about −40° C. to about 200° C., e.g., from about −40° C. to about 150° C., from about −40° C. to about 120° C., from about −40° C. to about 80° C., from about −20° C. to about 60° C., from about −30° C. to about 40° C., from about 0° C. to about 60° C., from about 0° C. to about 40° C., from about 10° C. to about 30° C., or from about 15° C. to about 25° C.

In many embodiments, the damping-enhanced PSA has a damping temperature range. In some embodiments, the temperature range for the damping-enhanced PSA with at least one acrylic-based damping additive may be from about 110° C. to about 150° C. In other embodiments, at least one damping additive is an acrylic-based damping additive resulting in damping enhanced pressure-sensitive adhesive with a damping temperature range between about −40° C. to about 150° C. In some embodiments, the temperature range for the damping-enhanced PSA with at least one rubber-based damping additive may be from about 110° C. to about 150° C. In other embodiments, at least one damping additive is a rubber-based damping additive resulting in damping enhanced pressure-sensitive adhesive with a damping temperature range between about −40° C. to about 150° C.

In many embodiments, at least one damping additive damping-enhanced pressure-sensitive adhesive may have a damping frequency ranging from about 5000 Hz to about 10000 Hz. In some embodiments, at least one acrylic-based damping additive damping-enhanced pressure-sensitive adhesive may have a damping frequency of at least about 5000 Hz. In other embodiments, at least one acrylic-based damping additive damping-enhanced pressure-sensitive adhesive may have a damping frequency of at least about 7200 Hz.

Beneficially, the damping-enhanced PSA has a broader damping temperature and/or frequency range than the initial PSA itself.

Structurally, in some embodiments, the damping additive is suspended in the silicone pressure-sensitive adhesive. In other embodiments, the damping additive is dissolved in the silicone PSA. In some cases, wherein the silicone PSA comprises a solvent, the damping additive is dissolved or dispersed in a solvent and then blended with the silicone pressure-sensitive adhesive. In another embodiment, the damping-enhanced pressure-sensitive adhesive is a heterogeneous mixture of the silicone PSA and at least one damping additive.

Further, in some embodiments, the damping-enhanced pressure-sensitive adhesive of any of the preceding claims, wherein the damping additive is an acrylic-based damping additive and the acrylic-based damping additive and the silicone PSA are not polymerized. In other embodiments, the damping-enhanced pressure-sensitive adhesive of any of the preceding claims, wherein the damping additive is a rubber-based damping additive and the rubber-based damping additive and the silicone PSA may not be polymerized.

Damping Additive

At least one damping additive (collectively, damping additive herein) may be added to improve the damping performance of the PSA across broader temperature and/or frequency ranges. The damping additive may have a damping temperature and frequency or a damping temperature and frequency range, as described above.

In some embodiments, the damping additive is a rubber-based damping additive. In other embodiments, the damping additive is an acrylic-based damping additive.

In some embodiments, the damping additive is a liquid in a temperature range of about 20° C. to about 25° C. In other embodiments, the damping additive is a powder or other solid form a temperature range of about 20° C. to about 25° C.

The damping additive comprises particles and the shape of the particles varies widely. In one embodiment the damping additive comprises substantially spherical particles. In preferred embodiments, these substantially spherical parties have an average particle size from about 1 micron to about 50 microns, e.g., from about 1 micron to about 5 microns, from about 1 micron to about 10 microns, from about 5 microns to 15 microns, from about 10 microns to about 25 microns, from about 10 microns to about 50 microns, from 25 microns to 30 microns, and from about 30 microns to about 50 microns.

In many embodiments, the damping additive is spherical (in various sizes). In other embodiments, the damping additive has random structures. In certain embodiments, the random structures did not contain spheres.

Suitable commercially available acrylic-based damping additives include PMMA-R-B1423 Microparticles GmbH, PMMA-R-B1299 Microparticles GmbH, PMMA-R-L54 Microparticles GmbH, Spheromers CA 6 (MicroBeads), MX 500 (Soken), MX 1000 (Soken), MX 1500H (Soken), Spheromers CA 10 MicroBeads, Spheromers CA 15 MicroBeads, TAFTIC™ C series (Toyobo), PMMA-R-L623 (Microparticles GmbH), and PMMA-R-B157 (Microparticles GmbH).

Some suitable rubber-based damping additives available as commercial products may include: TAPRYLCCF380 Taprath, TAPRYLCTMF490 Taprath, BL1022 Bullbrakes, Baymod® N33.53 VP Lanxess, Baymod® N34.52 Lanxess, Baymod® N XL 33.61 VP Lanxess, and Baymod® N XL Lanxess 33.64 VP. Some suitable additives may include: Kraton D-4153 ES (Kraton Polymers), Nipol 1052 (Zeon), Wingtack ET (Goodyear), Butyl rubber 065 (Exxon Chemical), Kraton D1114 P (Kraton Polymers), Kraton 116 (Kraton Polymers), Kraton SBS 1101 AS (Kraton Polymers), Quintac 3450 (Mitsui & Co Benelux), Vector 4111 (Exxon Chemicals), Quintac 3280 (Mitsui & Co Benelux), Vector 4113 (Exxon Chemicals), Escorez 1310 LC (Exxon Chemicals), Nipol 1041 (Zeon), Nipol NS 612 (Zeon), Vistanex LMH (Exxon Chemicals), Kraton 1160NS (Kraton Polymers), Kraton 1101 A (Kraton Polymers), Kraton 1161NS (Kraton Polymers), Kraton SB 1011 AC (Kraton Polymers), Kraton D1101 AS NC (Kraton Polymers), Escorez 1401 (Exxon Chemicals).

In many embodiments, the damping additive is added in weight % to the dry weight % of the silicone PSA.

Pressure-Sensitive Adhesive

The PSA component may vary widely. In some embodiments, the PSA comprises a silicone pressure-sensitive adhesive. In some embodiments, the PSA comprises at least one silicone-based polymer. In other embodiments, the PSA optionally comprises at least one initiator. In some embodiments, the initiator may be a peroxide. In some embodiments, the peroxide may be benzoyl peroxide (BPO). In other embodiments, the PSA optionally comprises at least one catalyst. In some embodiments, at least one catalyst may be a metal catalyst. In many embodiments, the metal catalysts may be used in addition curing of the PSA. In some embodiments, the metal catalysts may be rhodium (Rh), platinum (Pt), or tin (Sn) catalysts. In yet other embodiments, the metal catalysts may be gold (Au) catalysts. In other embodiments, the silicone pressure-sensitive adhesive may comprise at least one crosslinker. In other embodiments, the silicone pressure-sensitive adhesive may comprise an MQ resin. Other known PSA additives are also contemplated.

The silicone PSA may have a damping temperature and damping frequency or alternatively, a damping temperature range and damping frequency range. The damping temperature and frequency or a damping temperature range and frequency range may be determined. Based on the desired damping temperature and damping frequency, the damping additive may then be determined.

In one embodiment, the silicone PSA has a damping temperature ranging from about −40° C. to about 200° C., e.g., from about −40° C. to about 150° C., from about −20° C. to about 130° C., −10° C. to about 130° C., from about −5° C. to about 90° C., from about 0° C. to about 85° C., or from about 0° C. to about 80° C. In one embodiment, the silicone PSA has a damping temperature ranging from about 50° C. to about 120° C. The silicone PSA may comprise at least one damping additive. In some embodiments, the silicone PSA may comprise at least one acrylic-based damping additive. In other embodiments, the silicone PSA may comprise at least one rubber-based damping additive.

In one embodiment, the silicone PSA described herein has a damping temperature ranging from about 20° C. to about 60° C., e.g., from about −10° C. to about 55° C., from about −5° C. to about 50° C., from about 0° C. to about 50° C., from about 0° C. to about 40° C., from about 10° C. to about 30° C., or from about 15° C. to about 25° C. In some cases, the damping additive may be a rubber powder within a temperature range described above. In other embodiments, the damping additive may be an acrylic powder within a temperature range described above.

In one embodiment, the silicone PSA has a damping temperature ranging from about 110° C. to about 150° C. In some embodiments, the damping additive is an acrylic powder.

In many embodiments, the silicone PSAs comprise silicone-based monomers. Examples of suitable commercial silicone-based PSAs are described herein. These products are exemplary and are not meant to limit the scope of the PSA.

Where the monomer is a silicone-based monomer, the monomer may be a single polymer species or a mixture of two or more polymers, as long as at least one of the polymers is a silicone-based polymer. In many embodiments, the silicone PSA has a siloxane backbone. In many embodiments, the silicone PSA is comprised of polydimethylsiloxane (PDMS). For the silicone PSA, weight average molecular weight (Mw), Mw distribution, MQ resin type, and other polymer compositional factors may affect the damping properties of the silicone PSA.

The silicone-based monomer of the silicone-based polymer may comprise, but are not limited to, siloxanes, silanes, silatrane glycols, and mixtures thereof. Other suitable silicone-based monomers include, 1,4-Bis[dimethyl[2-(5-norbornen-2-yl)ethyl]silyl]benzene; 1,3-Dicyclohexyl-1,1,3,3-tetrakis(dimethylsilyloxy)disiloxane; 1,3-Dicyclohexyl-1,1,3,3-tetrakis(dimethylvinylsilyloxy)disiloxane; 1,3-Dicyclohexyl-1,1,3,3-tetrakis[(norbornen-2-yl)ethyldimethylsilylox)]disiloxane; 1,3-Divinyltetramethyldisiloxane; 1,1,3,3,5,5-Hexamethyl-1,5-bis[2-(5-norbornen-2-yl)ethyl]trisiloxane; 1,1,3,3-Tetramethyl-1,3-bis[2-(5-norbornen-2-yl)ethyl]disiloxane; 2,4,6,8-Tetramethyl-2,4,6,8-tetravinylcyclotetrasiloxane; N-[3-(Trimethoxysilyl)propyl]-N'-(4-vinylbenzyl) ethylenediamine; 3-[Tris(trimethylsiloxy)silyl]propyl vinyl carbamate; and mixtures thereof. In other embodiments, methyl and phenyl type silicone PSAs may be selected for the damping-enhanced pressure-sensitive adhesive. Combinations of these monomers may be polymerized to form the silicone-based PSA. In many embodiments, the resin may be polymerized as part of the silicone pressure-sensitive adhesive.

Suitable commercially available silicone-based products, e.g., that contain silicone polymer, include but are not limited to, products from KRT 009 (Shin Etsu), KRT 794 (Shin Etsu), PSA 6574 (Momentive), Q2-7735 (Dow Chemical), 2-7066 (Dow Chemical), 2-7466 (Dow Chemical), 2-7366 (Dow Chemical), DC 282 (Dow Chemical), DC 280A (Dow Chemical), DC 7957 (Dow Chemical), DC 7956 (Dow Chemical), Q2-7406 (Dow Chemical), KRT 026 (Shin Etsu), KRT 002 (Shin Etsu), KRT 006 (Shin Etsu), KRT 003 (Shin Etsu), KR 3700 (Shin Etsu), KCT 7771 (Shin Etsu), KR 100 (Shin Etsu), PSA 518 (Momentive), PSA 915 (Momentive), PSA 595 (Momentive), Silgrip SR545 (Momentive), PSA 610e (Momentive), Bluestar PSA 400, and Silicolease PSA 418 (Elkem).

It will be appreciated that the present subject matter is not limited to any particular silicone polymer component, and includes a wide array of such components.

A wide array of functional groups can be incorporated in polymer formed from the monomer. The functional groups may be incorporated into the polymer formed from the silicon-based monomer, for example as end segments. Representative functional groups may include, without limitation, hydroxy, epoxy, cyano, isocyanate, amino, aryloxy, aryalkoxy, oxime, aceto, epoxyether and vinyl ether, alkoxymethylol, cyclic ethers, thiols, benzophenone, acetophenone, acyl phosphine, thioxanthone, and derivatives of benzophenone, acetophenone, acyl phosphine, and thioxanthone.

The optional catalyst may be present in an amount ranging from about 0 wt % to about 3 wt %, based on the total weight of the PSA. In term of lower limits, the optional catalyst may be present in an amount at least about 0.1 wt %. In terms of upper limits, the optional catalyst may be present in an amount less than about 3 wt %.

Other optional components are also contemplated. These additives can include, but are not limited to, one or more tackifiers, waxes, surfactants, talc, powdered silicates, filler agents, defoamers, colorants, antioxidants, UV stabilizers, luminescents, buffer agents, anti-blocking agents, wetting agents, matting agents, antistatic agents, acid scavengers, flame retardants, processing aids, extrusion aids, and combinations thereof, some of which are described below.

Layered Configurations

Many configurations of the PSA and the damping additive are contemplated. Some are now described. Other configurations are also contemplated.

In one embodiment, the damping-enhanced PSA comprises at least one adhesive layer comprising the silicone pressure-sensitive adhesive and at least one damping additive layer comprising at least one damping additive. In some cases, the adhesive layer comprises at least one damping additive and the damping additive layer comprises at least one damping additive, preferably the adhesive layer and the damping additive layer comprise the same damping additive. In another embodiment, the damping-enhanced PSA comprises: 1) a first adhesive layer comprising the silicone PSA and at least one damping additive and 2) a second adhesive layer comprising substantially no damping additive. An optional liner may be utilized on the (otherwise) exposed surface of at least one adhesive layer. In other embodiments, the damping-enhanced PSA may also comprise an optional carrier. In one embodiment, the damping-enhanced PSA tape contains a single layer of the damping-enhanced silicone PSA and at least one liner or carrier.

In other embodiments, the damping-enhanced PSA tape may comprise two damping layers: 1) a first PSA layer that comprises either: (a) at least one damping additive or (b) no damping additive; and 2) a second PSA layer that comprises at least one damping additive. If the first PSA comprises at least one damping additive, then the damping additive may be the same type or a different type from at least one damping additive in the second PSA layer. If the first PSA comprises at least one damping additive, then the damping additive may be the same concentration or a different concentration from at least one damping additive in the second PSA layer. An optional liner may be utilized on the (otherwise) exposed surface of the first and/or second PSA layers. In other embodiments, an optional carrier may be used within the layers of the PSA. For example, the carrier may be disposed between the first PSA layer and the second PSA layer.

In one embodiment, a configuration comprises three layers: 1) a first PSA layer that comprises either: (a) at least one damping additive or (b) no damping additive; 2) a second PSA layer that comprises at least one damping additive; and 3) an additive layer sandwiched between the first and second PSA layers. If the first PSA comprises at least one damping additive, then the damping additive may be the same type or a different type from at least one damping additive in the second PSA layer. If the first PSA comprises at least one damping additive, then the damping additive may be the same concentration or a different concentration from at least one damping additive in the second PSA layer. An optional liner may be utilized on the (otherwise) exposed surface of the first and/or second PSA layers. In other embodiments, an optional carrier may be used within the layers of the PSA. For example, the carrier may be disposed between the first PSA layer and the second PSA layer.

In one embodiment, a configuration comprises a silicone PSA layer and a separate damping additive layer. The silicone PSA layer, in some cases, also comprises damping additive. In other cases, the silicone PSA layer comprises little or no damping additive.

In one embodiment, a configuration comprises three layers: a first PSA layer that comprises damping additive; a second PSA layer that comprises damping additive; and a damping additive layer sandwiched between the first and second PSA layers.

In one embodiment, a configuration comprises three layers: a first PSA layer that comprises little or no damping additive; a second PSA layer that comprises little or no damping additive; and a damping additive layer sandwiched between the first and second PSA layers.

In one embodiment, a configuration comprises three layers: a first PSA layer that comprises damping additive; a second PSA layer that comprises damping additive; and a third PSA layer that comprises damping additive.

In one embodiment, a configuration comprises multiple layers: a first PSA layer that comprises damping additive; and one or more additional PSA layers, each of which comprises little or no damping additive.

In another embodiment, a tape comprising a layer of the damping enhanced PSA described herein. In some embodiments, the tape may be a transfer tape.

Generally, a liner may be included on an (otherwise) exposed surface of a layered configuration.

EXAMPLES

Analysis were performed to evaluate various properties and characteristics of silicone adhesive tapes in accordance with the present subject matter. Test methods described below include SAE J3001.

Tables 1-2 provide some test results against a reference silicone PSA for various damping additives added to the reference silicone PSA. With these examples, the addition of the rubber-based damping additive may provide increased damping at higher temperatures and frequencies. Additionally, the addition of the rubber-based damping additive may provide increased damping in these broader frequencies, even at the higher temperatures as compared to the reference. All quantities are expressed in dry weights.

TABLE 1

Damping Additive Addition to Silicone PSA

| Si PSA | Si PSA amount (g) | initiator | Active initiator amount (g) | damping additive | damping additive amount (g) |
|---|---|---|---|---|---|
| sample 1 Q2-7406 | 100 | Perkadox CH 50 L | 2 | no | 0 |
| sample 2 Q2-7406 | 100 | Perkadox CH 50 L | 2 | mica | 10 |
| sample 3 Q2-7406 | 100 | Perkadox CH 50 L | 2 | Soken MX 500 | 10 |
| sample 4 Q2-7406 | 100 | Perkadox CH 50 L | 2 | Nipol 1052 | 10 |

TABLE 2

Damping Additive Addition to Silicone PSA Damping Testing

| Si PSA | Si PSA amount (g) | catalyst | Active catalyst amount (g) | damping additive | damping additive amount (g) |
|---|---|---|---|---|---|
| sample 5 DC 2013 | 100 | Syl-Off 4000 | 0.4 | no | 0 |
| sample 6 DC 2013 | 100 | Syl-Off 4000 | 0.4 | Kraton 1116 | 10 |

Tables 1 and 2 above provide some examples of additives added to a silicone PSA. With these examples, the addition of the acrylic-based damping additive and rubber-based damping additive may provide increased damping at higher and/or broader temperatures. The addition of certain additives provided above may also provide damping at broader frequencies and/or higher frequencies resulting in an increased damping surface.

Other testing results include the following in Tables 3 and 4:

TABLE 3

Various additives in Silicone PSA (all samples with PSA 6574) and Results

| | Si PSA amount (g) | initiator | Active initiator amount (g) | MQ resin | MQ resin amount (g) | damping additive | damping additive amount (g) |
|---|---|---|---|---|---|---|---|
| sample 7 | 100 | Perkadox CH 50 L | 2.5 | SR 545 | 5 | no | 0 |
| sample 8 | 100 | Perkadox CH 50 L | 2.5 | SR 545 | 5 | mica | 10 |
| sample 9 | 100 | Perkadox CH 50 L | 2.5 | SR 545 | 5 | Soken MX 500 | 10 |
| sample 10 | 100 | Perkadox CH 50 L | 2.5 | SR 545 | 5 | Soken MX 500 | 1 |
| sample 11 | 100 | Perkadox CH 50 L | 2.5 | SR 545 | 5 | Soken MX 500 | 50 |

TABLE 4

Damping Results

| | damping surface (damping > 2.5%) ° C. × kHz | damping surface (damping > 3%) ° C. × kHz |
|---|---|---|
| sample 1 | 274 | 166 |
| sample 2 | 1134 | 68 |
| sample 3 | 1017 | 992 |
| sample 4 | 1583 | 756 |
| sample 5 | 810 | 248 |
| sample 6 | 1104 | 1104 |
| sample 7 | 1188 | 418 |
| sample 8 | 634 | 367 |
| sample 9 | 1764 | 1224 |
| sample 10 | 1278 | 739 |
| sample 11 | 1998 | 1944 |
| sample 12 (rubber 1101AS) | 208 | 193 |

Further, the damping enhanced pressure sensitive adhesive described herein may have a certain damping %. In many embodiments, the damping-enhanced pressure sensitive adhesive described herein may have a damping temperature ranging from about −40° C. to about 200° C. and a frequency range between about 10 Hz and about 10000 Hz. In another embodiment, the temperature range may be between about −40° C. to about 150° C. In another embodiment, the frequency range may be between about 100 Hz and about 8000 Hz. Further, the damping enhanced pressure sensitive adhesive described herein may have a certain minimal damping % at a temperature range of about −40° C. to about 200° C. and a frequency range of about 10 Hz and about 10000 Hz (as measured by SAE J 3001). In many embodiments, the damping % is at least about 2.5% at a temperature range of about −40° C. to about 200° C. and a frequency range of 10 Hz and about 10000 Hz (as measured by SAE J 3001). In some embodiments where the damping-enhanced pressure-sensitive adhesive has a damping % of at least about 2.5%, the damping surface (frequency range times temperature range as measured by SAE J 3001) is at least 10% greater than the damping surface of a pressure-sensitive adhesive without at least one damping additive. In some embodiments, the damping surface (frequency range times temperature range as measured by SAE J 3001) is at least 10% greater than the damping surface of the unmodified pressure-sensitive adhesive without at least one damping additive. In some embodiments where the damping-enhanced pressure-sensitive adhesive has a damping % of at least about 2.5%, the damping surface (frequency range times temperature range as measured by SAE J 3001) is at least 20% greater than the damping surface of a pressure-sensitive adhesive without at least one damping additive. In some embodiments, the damping surface (frequency range times temperature range as measured by SAE J 3001) is at least 20% greater than the damping surface of a pressure-sensitive adhesive without at least one damping additive. In many embodiments where the damping % is at least about 2.5%, the damping is at least 10% greater than the damping surface of a pressure-sensitive adhesive without at least one damping additive. In some embodiments, the damping surface (frequency range times temperature range as measured by SAE J 3001) is at least 10% greater than an unmodified silicone PSA without at least one damping additive. In some embodiments where the damping % is at least about 2.5%, the damping is at least 20% greater than the damping surface of a pressure-sensitive adhesive without at least one damping additive. In some embodiments, the damping surface (frequency range times temperature range as measured by SAE J 3001) is at least 20% greater than the silicone PSA without at least one damping additive. In some embodiments where the damping % is at least about 2.5%, the damping surface is at least about 30% greater than the damping surface of a pressure-sensitive adhesive without at least one damping additive. In some embodiments, the damping surface (frequency range times temperature range as measured by SAE J 3001) is at least 30% greater than the damping surface of a pressure-sensitive adhesive without at least one damping additive. In yet other embodiments where the damping % is at least about 2.5%, the damping is at least about 50% greater than the damping surface of a pressure-sensitive adhesive without at least one damping additive. In some embodiments, the damping surface (frequency range times temperature range as measured by SAE J 3001) is at least 50% greater than the damping surface of a pressure-sensitive adhesive without at least one damping additive (as measured by SAE J 3001). In other embodiments, the damping enhanced pressure sensitive adhesive described herein may have the damping % at a temperature range of about −40° C. to about 200° C. and a frequency range of about 10 Hz and about 10000 Hz and is at least about 3% (as measured by SAE J 3001). In some embodiments where the damping-enhanced pressure-sensitive adhesive has a damping % of at least about 3%, the damping surface (frequency range times temperature range as measured by SAE J 3001) is at least about 100% greater than the damping surface of a pressure-sensitive adhesive without at least one damping additive. In some embodiments, the damping surface (frequency range times temperature range as measured by SAE J 3001) is at least 100% higher compared to the damping surface of the unmodified pressure-sensitive adhesive without at least one damping additive. In some embodiments where the damping-enhanced pressure-sensitive adhesive has a damping % of at least about 3%, the damping surface (frequency range times temperature range as measured by SAE J 3001) is at least about 300% greater than the damping surface of a pressure-sensitive adhesive without at least one damping additive (as measured by SAE J 3001). In some embodiments, the damping surface (frequency range times temperature range as measured by SAE J 3001) is at least 300% greater than the damping surface of a pressure-sensitive adhesive without at least one damping additive. In many embodiments where the damping % is at least about 3%, the damping is about 100% greater than the damping surface of a pressure-sensitive adhesive without at least one damping additive. In some embodiments, the damping surface (frequency range times temperature range as measured by SAE J 3001) is at least 100% greater than the damping surface of a pressure-sensitive adhesive without at least one damping additive. In some embodiments, the damping surface (frequency range times temperature range as measured by SAE J 3001) is at least 100% greater than the damping surface of a pressure-sensitive adhesive without at least one damping additive (as measured by SAE J 3001). In many embodiments where the damping % is at least about 3%, the damping is about 200% greater than the damping surface of a pressure-sensitive adhesive without at least one damping additive. In some embodiments, the damping surface (frequency range times temperature range as measured by SAE J 3001) is at least 200% greater than the damping surface of a pressure-sensitive adhesive without at least one damping additive (as measured by SAE J 3001). In many embodiments where the damping % is at least about 3%, the damping is about 300% greater than the damping surface of a pressure-sensitive adhesive without at least one damping additive. In some embodiments, the damping surface (frequency range times temperature range as measured by SAE J 3001) is at least 300% greater than the damping surface of a pressure-sensitive adhesive without at least one damping additive (as measured by SAE J 3001). Further, the damping % results may be seen in FIG. 1 where the damping % (modal damping) is shown as a function of temperature and frequency (as measured by the Link Maultheet device).

While the invention has been described in detail, modifications within the spirit and scope of the invention will be readily apparent to those of skill in the art. In view of the foregoing discussion, relevant knowledge in the art and references described above in connection with the Background and Detailed Description, the disclosures of which are all incorporated herein by reference. In addition, it should be understood that aspects of the invention and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the invention.

We claim:

1. A damping-enhanced pressure-sensitive adhesive comprising a mixture of:
   (i) a silicone pressure-sensitive adhesive in an amount ranging about 50 wt % to about 99.9 wt %, based on the total dry weight of the damping-enhanced silicone pressure-sensitive adhesive;
       wherein the silicone pressure sensitive adhesive comprises:
       at least one silicone-based polymer;
       a resin;
       optionally at least one catalyst; and
       optionally at least one initiator; and
   (ii) at least one damping-additive in an amount ranging from about 0.1 wt % to about 50 wt %,
       wherein the damping-additive is selected from the group consisting of an acrylic-based damping additive, a rubber-based damping additive, and combinations thereof; and wherein the damping enhanced silicone pressure sensitive adhesive has a modified damping temperature range of from −40 to 200° C. and a modified damping frequency range of from 10 to 10000 Hz.

2. The damping-enhanced pressure-sensitive adhesive of claim 1, wherein the damping-enhanced pressure-sensitive adhesive has a damping temperature ranging from about −40° C. to about 200° C.

3. The damping-enhanced pressure-sensitive adhesive of claim 1, wherein the damping-enhanced pressure-sensitive adhesive has a damping frequency ranging from about 10 Hz to about 10000 Hz.

4. The damping-enhanced pressure-sensitive adhesive of claim 1, wherein the damping-enhanced pressure-sensitive adhesive has a damping frequency ranging from about 100 Hz to about 8000 Hz.

5. The damping-enhanced pressure-sensitive adhesive of claim 1, wherein the damping % is at least about 2.5% and the damping surface (frequency range times temperature range) is at least 10% greater than the damping surface of a pressure-sensitive adhesive without at least one damping additive.

6. The damping-enhanced pressure-sensitive adhesive of claim 1, wherein the damping % is at least about 2.5% and the damping surface (frequency times temperature) is at least 20% greater than the damping surface of a pressure-sensitive adhesive without at least one damping additive.

7. The damping-enhanced pressure-sensitive adhesive of claim 1, wherein the damping % is at least about 3% and the damping surface (frequency range times temperature range) is at least about 50% greater than the damping surface of a pressure-sensitive adhesive without at least one damping additive.

8. The damping-enhanced pressure-sensitive adhesive of any of claim 1, wherein the damping % is at least about 3% and the damping surface (frequency range times temperature range) is at least about 100% greater than the damping surface of a pressure-sensitive adhesive without at least one damping additive.

9. The damping-enhanced pressure-sensitive adhesive of claim 1, wherein at least one damping additive is an acrylic-based damping additive resulting in damping enhanced pressure-sensitive adhesive with a damping temperature range between about −40° C. to about 150° C.

10. The damping-enhanced pressure-sensitive adhesive of claim 1, wherein at least one damping additive is a rubber-based damping additive resulting in a damping enhanced pressure-sensitive adhesive with a damping temperature range from about −40° C. to about 150° C.

11. The damping-enhanced pressure-sensitive adhesive of claim 1, wherein the damping additive comprises particles having an average particle size ranging from about 1 micron to about 50 microns.

12. The damping-enhanced pressure-sensitive adhesive of claim 1, wherein the damping additive is suspended in the silicone pressure-sensitive adhesive.

13. The damping-enhanced pressure-sensitive adhesive of claim 1, wherein the damping additive is dissolved in the silicone pressure-sensitive adhesive.

14. The damping-enhanced pressure-sensitive adhesive of claim 1, wherein the damping-enhanced pressure-sensitive adhesive is a heterogeneous mixture of the silicone pressure-sensitive adhesive and at least one damping additive.

15. The damping-enhanced pressure-sensitive adhesive of claim 1, wherein the resin comprises an MQ resin.

16. The damping-enhanced pressure-sensitive adhesive of claim 1, wherein the pressure-sensitive adhesive further comprises a crosslinker.

17. The damping-enhanced pressure-sensitive adhesive of claim 1, wherein the damping additive is a powder or solid at a temperature range of about 20° C. to about 25° C.

18. The damping-enhanced pressure-sensitive adhesive of claim 1, wherein the damping additive is a liquid at a temperature range of about 20° C. to about 25° C.

19. The damping-enhanced pressure-sensitive adhesive of claim 1, wherein at least one initiator is a peroxide.

20. The damping-enhanced pressure-sensitive adhesive of claim 19, wherein peroxide is benzoyl peroxide (BPO).

21. The damping-enhanced pressure-sensitive adhesive of claim 1, wherein at least one catalyst is a metal.

22. The damping-enhanced pressure-sensitive adhesive of claim 21, wherein the metal is Pt, Rh, and Sn.

23. The damping-enhanced pressure-sensitive-adhesive of claim 1, wherein the damping-enhanced pressure-sensitive adhesive comprises: 1) at least one adhesive layer comprising the silicone pressure-sensitive adhesive and 2) at least one damping additive layer comprising at least one damping additive.

24. The damping-enhanced pressure-sensitive adhesive of claim 23, wherein the adhesive layer comprises at least one damping additive and the damping additive layer comprises at least one damping additive.

25. The damping-enhanced pressure-sensitive adhesive of claim 23, wherein the adhesive layer and the damping additive layer comprise the same damping additive.

26. The damping-enhanced pressure-sensitive adhesive of claim 23, wherein the damping-enhanced pressure-sensitive adhesive comprises a first adhesive layer comprising the silicone pressure-sensitive adhesive and at least one damping additive and a second adhesive layer comprising no damping additive.

27. A tape comprising the damping-enhanced pressure-sensitive adhesive of claim 1.

28. The tape of claim 27, wherein the tape is a transfer tape.

29. A method for modifying a silicone pressure-sensitive adhesive to improve damping characteristics, the method comprising:

providing the silicone pressure sensitive adhesive of claim 1;
adding at least one damping additive to the silicone pressure-sensitive adhesive; and
mixing;
thereby producing a damping enhanced silicone pressure sensitive adhesive having a modified damping temperature range from −40 to 200° C. and a modified damping frequency range of from 10 to 100000 Hz.

30. A method for modifying a silicone pressure-sensitive adhesive to improve damping characteristics, the method comprising:
providing a silicone pressure sensitive adhesive comprising
(a) at least one silicone-based polymer;
(b) a resin;
(c) optionally at least one catalyst; and
(d) optionally at least one initiator;
adding at least one damping additive and optionally the at least one catalyst to the at least one silicone-based polymer and
mixing;
thereby producing a damping enhanced silicone pressure sensitive adhesive having a modified damping temperature range from −40 to 200° C. and a modified damping frequency range of from 10 to 100000 Hz.

31. The method of claim 30, further comprising:
determining an amount of the damping additive, based on a damping temperature range and a frequency range of the silicone pressure sensitive adhesive and the modified damping temperature range and the modified damping frequency range of the damping-enhanced silicone pressure sensitive adhesive.

32. The method of claim 30, wherein at least one damping additive selected from the group comprising an acrylic-based damping additive, a rubber-based damping additive, and combinations thereof, present in an amount ranging from about 0.1 wt % to about 50 wt %, based on the total weight of the damping-enhanced pressure-sensitive adhesive.

33. The damping-enhanced pressure-sensitive adhesive of claim 1, wherein the acrylic-based damping additive and the silicone PSA are not polymerized.

34. The damping-enhanced pressure-sensitive adhesive of claim 1, wherein the rubber-based damping additive and the silicone PSA are not be polymerized.

* * * * *